Patented Feb. 26, 1946

2,395,502

UNITED STATES PATENT OFFICE 2,395,502

COMPOSITION FOR LINING THE JOINTS OF SHEET METAL CONTAINERS

John E. Robinson, Glen Ellyn, and Paul W. Millelot, Jr., Maywood, Ill., assignors to American Can Company, New York, N. Y., a corporation of New Jersey No Drawing. Application July 2, 1941, Serial No. 400,866

2 Claims. (Cl. 106—151)

The present invention relates to compounds for lining can ends which are used in containers for holding cleaning fluids such as carbon tetrachloride, petroleum naphthas and the like and has for its object broadly the provision of a compound lining material which will not be dissolved or disturbed by the necessary ingredients used in such cleaning mixtures but will provide for fully hermetic sealing in the seams between the can body and its bottom and top ends.

Cleaning fluids of this general nature are exceedingly hard to hold in metal containers having double seamed end joints by reason of the highly penetrating effect such fluids naturally have on rubber or similar substances which have been largely used for gaskets in such double seams.

In this invention an improved lining compound is made by mixing alcohol soluble zein with cellulose nitrate, a suitable plasticizer and pigment filler so that a gasket lining material is produced which can be used satisfactorily in the end seam joints of metal cans for such products as cleaning fluids.

The gasket material being liquid when produced may be flowed into can end grooves by conventional gasket compound lining machines and may be set or dried by usual methods. Such lined ends thereupon are united to the can bodies in the standard double seamed joints so largely used in can manufacture.

Numerous other objects and advantages of the invention will be apparent as it is better understood from the following description which is of a preferred embodiment thereof.

The procedure required in producing such an improved gasket lining mixture comprises the thorough mixing together of certain proportions of the ingredients and in definite sequence in order to provide the desired dissolving and plasticizing actions.

A workable and preferable formula is given as an example, but it will be understood that the quantities are variable to some extent to adapt the final mixture to desired lining conditions.

| | | |
|---|---|---|
| Dry cellulose nitrate | lbs | 3.33 |
| Alcohol soluble zein | lbs | 4.75 |
| Glycol phthalate | lbs | 23.80 |
| Denatured alcohol (special denatured #1) | lbs | 110.09 |
| Methyl Cellosolve | lbs | 19.20 |
| Titanium dioxid | grams | 304 |
| Carbon black | do | 4.6 |
| Sodium carbonate (monohydrate) | do | 542 |

The best procedure in preparing the formula, is to pour the denatured alcohol and the Methyl Cellosolve into a suitable mixing tank and then to add dry cellulose nitrate slowly while stirring until it is in complete solution. To this solution the alcohol soluble zein is added slowly while maintaining constant agitation and until it is dissolved completely. Finally the glycol phthalate is mixed in to form one part of the compound. For purposes of description, such a part may be termed the zein mixture.

The titanium dioxid, the carbon black, the sodium carbonate and a small amount of denatured alcohol and Methyl Cellosolve then are mixed separately in a suitable ball mill until a smooth thin paste is formed. This provides the second part of the compound and may be referred to as the filler ingredients.

Part two, i. e., the filler mixture, is added to part one, the zein mixture, to provide a homogeneous mass. Combining these parts is a relatively slow procedure and will require from thirty minutes to one hour in time. This step in the process is done most proficiently perhaps by slowly adding the filler mixture to the zein mixture while the latter is in the mixing tank. Any other suitable way of stirring the mixtures together, whereby a thoroughly homogeneous mass is obtained, is satisfactory.

The desired viscosity for the final lining compound is obtained at this stage of the procedure by introducing more of the solvent if a thinner consistency is desired or by evaporating some of the solvent if a thicker consistency is wanted. The manner of lining the can ends with the compound largely will determine the viscosity. Obviously, if the lining is to be done by means of the nozzle type of compound liner, the final lining compound must be thin enough to permit free flowing through the nozzle. If the compound is applied as in the printing or die lining manner, more solids may be employed.

In the foregoing formula the alcohol soluble zein combines with the dry cellulose nitrate to provide body for the compound. The glycol phthalate provides a plasticizer for rendering the mixture sufficiently flexible to adapt it for compound lining the joints between the can ends and the bodies. The proper handling of these materials is effected by use of the solvents in the present case are the denatured alcohol and the Methyl Cellosolve. Other suitable solvent combinations may be employed in order to alter the drying characteristics of the compound.

The titanium dioxid and the carbon black provide fillers for producing color in the dried gasket.

The sodium carbonate is used as an agent to neutralize any free acid which may exist in the glycol phthalate during the preparation and lining of the compound.

The material thus obtained is adaptable for usual lining procedure in the closing of can seams and by reason of the resistance against penetration of the contents of the cans, it is particularly adapted for such materials as cleaning fluids.

It is thought that the invention and many of its attendant advantages will be understood from the foregoing description, and it will be apparent that various changes may be made in the matter of the ingredients, their identity and their proportions without departing from the spirit and scope of the invention or sacrificing all of its material advantages, the form hereinbefore described being merely a preferred embodiment thereof.

We claim:

1. A gasket lining composition for lining the joints of sheet metal containers which must hold cleaning fluids and the like, consisting essentially of a homogenous mixture of alcohol soluble zein and cellulose nitrate, glycol phthalate as a plasticizer, titanium dioxide and carbon black as filler and coloring material and a compatible solvent, said zein and cellulose nitrate constituting approximately 8 parts of which the zein is approximately 4.75 parts, said plasticizer approximately 24 parts and said filler and coloring material approximately 1 part by weight of the nonvolatile components of said mixture, said composition being further characterized by providing an hermetic seal for fluids which contain highly penetrating ingredients.

2. A gasket lining composition for lining the joints of sheet metal containers which must hold cleaning fluids and the like, comprising the following mixture in approximately the following proportions by weight:

| | | |
|---|---|---|
| Cellulose nitrate | pounds | 3.33 |
| Alcohol soluble zein | do | 4.75 |
| Glycol phthalate | do | 23.80 |
| Compatible solvent | do | 129.29 |
| Filler and coloring material | grams | 308.6 | said composition being further characterized by providing an hermetic seal for fluids which contain highly penetrating ingredients.

JOHN E. ROBINSON.
PAUL W. MILLELOT, Jr.